United States Patent
Montojo et al.

(10) Patent No.: US 9,735,928 B2
(45) Date of Patent: *Aug. 15, 2017

(54) SCRAMBLING AND MODULATION TO CONSTRAIN THE CONSTELLATION SIZE OF ACK/NAK TRANSMISSION ON THE DATA CHANNEL

(71) Applicant: QUALCOMM Incorporated, San Diego, CA (US)

(72) Inventors: Juan Montojo, Nuremberg (DE); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 14/247,305

(22) Filed: Apr. 8, 2014

(65) Prior Publication Data

US 2014/0219217 A1    Aug. 7, 2014

Related U.S. Application Data

(63) Continuation of application No. 12/411,322, filed on Mar. 25, 2009, now Pat. No. 8,737,517.

(Continued)

(51) Int. Cl.
| | | |
|---|---|---|
| *H04L 1/18* | (2006.01) | |
| *H04L 1/16* | (2006.01) | |
| *H04L 5/00* | (2006.01) | |

(52) U.S. Cl.
CPC .......... *H04L 1/1812* (2013.01); *H04L 1/1664* (2013.01); *H04L 1/1692* (2013.01); *H04L 5/0055* (2013.01)

(58) Field of Classification Search
None
See application file for complete search history.

(56) References Cited

U.S. PATENT DOCUMENTS 6,947,501 B2    9/2005    Kawai et al.
7,126,928 B2    10/2006   Tiedemann et al.
(Continued)

FOREIGN PATENT DOCUMENTS

AU    2008293691 A1    3/2009
EP    0302622 A2       2/1989
(Continued)

OTHER PUBLICATIONS

3GPP TS 36.211, V8.2.0 (Mar. 2008), 3rd Generation Partnership Project; Technical Specification Group Radio Access Network; Evolved Universal Terrestrial Radio Access (E-UTRA); Physical Channels and Modulation (Release 8), Mar. 2008, http://www.3gpp.org/ftp/Specs/archive/36_series/36.211/36211-820.zip.

(Continued)

*Primary Examiner* — Charles C Jiang
*Assistant Examiner* — Hector Reyes Ortiz

(57) ABSTRACT

Aspects describe maximizing a Euclidean distance for an ACK transmission as a function of the number of bits in a HARQ-ACK and a modulation order. Encoding includes placing escape sequences in the HARQ-ACK, wherein the number of escape sequences is based on the number of bits and the modulation order. Multiple encoded ACK blocks are combined to obtain a vector sequence that is multiplexed with the encoded data and interleaved, such as on a "time-first" manner. Scrambling is performed as a function of the size and the modulation order. For a 1-bit ACK, the scrambling is performed to achieve any two corners in any constellation for transmission for the ACK. For a 2-bit ACK, the scrambling is performed to achieve any four corners in any constellation for transmission for the ACK.

22 Claims, 12 Drawing Sheets

Related U.S. Application Data

(60) Provisional application No. 61/039,724, filed on Mar. 26, 2008.

(56) References Cited

U.S. PATENT DOCUMENTS

| | | | |
|---|---|---|---|
| 7,315,527 | B2 | 1/2008 | Wei et al. |
| 7,539,122 | B2 | 5/2009 | Agin et al. |
| 7,630,451 | B2 | 12/2009 | Collins et al. |
| 7,680,094 | B2 | 3/2010 | Liu |
| 7,912,133 | B2 | 3/2011 | Cheon et al. |
| 2003/0108013 | A1 | 6/2003 | Hwang et al. |
| 2005/0068909 | A1 | 3/2005 | Chae et al. |
| 2007/0110055 | A1 | 5/2007 | Fischer et al. |
| 2008/0086669 | A1 | 4/2008 | Cheng et al. |
| 2009/0042558 | A1 | 2/2009 | Shen et al. |
| 2009/0129317 | A1* | 5/2009 | Che ............ H04L 1/1614 370/328 |
| 2009/0232070 | A1* | 9/2009 | Muharemovic ..... H04L 1/1671 370/329 |
| 2009/0245421 | A1 | 10/2009 | Montojo et al. |
| 2009/0285193 | A1* | 11/2009 | Kim ............ H04L 5/0007 370/342 |
| 2011/0249578 | A1 | 10/2011 | Nayeb Nazar et al. |
| 2012/0044884 | A1 | 2/2012 | Jang et al. |
| 2012/0127950 | A1 | 5/2012 | Chung et al. |
| 2013/0163521 | A1 | 6/2013 | Lee et al. |

FOREIGN PATENT DOCUMENTS

| | | |
|---|---|---|
| RU | 2006110206 | 10/2007 |
| WO | 2005015941 A2 | 2/2005 |
| WO | 2005018270 | 2/2005 |
| WO | 2006076451 A2 | 7/2006 |
| WO | 2008140827 A1 | 11/2008 |
| WO | 2009029511 A1 | 3/2009 |
| WO | 2009044367 A2 | 4/2009 |

OTHER PUBLICATIONS

3GPP TS 36.212, V8.2.0 (Mar. 2008), 3rd Generation Partnership Project; Technical Specification Group Radio Access Network; Evolved Universal Terrestrial Radio Access (E-UTRA); Multiplexing and channel coding (Release 8), Section 5.2.3 (Mar. 2008), http://www.3gpp.org/ftp/Specs/archive/36_series/36.212/36212-820.zip.

International Search Report and Written Opinion—PCT/US2009/038370, ISA/EPO—Sep. 25, 2009.

Motorola, "Control and Data Multiplexing on PUSCH", 3GPP TSG-RAN WG1#52, R1-080741, Feb. 6, 2008, URL:http://www.3gpp.org/ftp/tsg_ran/WG1_RL1/TSGR1_52/Docs/R1-080741.zip.

Nokia Siemens Networks, Nokia, "ACK/NACK modulation with UL data", 3GPP TSG-RAN WG1#50, R1-073657, Aug. 15, 2007, URL:http://www.3gpp.org/ftp/tsg_ran/WG1_RL1/TSGR1_50/Docs/R1-073657.zip.

Taiwan Search Report—TW098109956—TIPO—Jan. 9, 2013.

* cited by examiner

SCRAMBLING AND MODULATION TO CONSTRAIN THE CONSTELLATION SIZE OF ACK/NAK TRANSMISSION ON THE DATA CHANNEL

CROSS REFERENCE TO RELATED APPLICATIONS

The present application is a Continuation of U.S. patent application Ser. No. 12/411,322, filed Mar. 25, 2009, entitled "SCRAMBLING AND MODULATION TO CONSTRAIN THE CONSTELLATION SIZE OF ACK/NAK TRANSMISSION ON THE DATA CHANNEL," now allowed, which claims the benefit of U.S. Provisional Application Ser. No. 61/039,724, filed Mar. 26, 2008, entitled "A METHOD AND APPARATUS FOR ACK TRANSMISSION IN A WIRELESS COMMUNICATION SYSTEM," and assigned to the assignee hereof and the entirety of which is incorporated herein by reference.

BACKGROUND

I. Field

The following description relates generally to wireless communications and more particularly to maximizing the Euclidean distance of coding, scrambling, and modulation for ACK/NAK.

II. Background

Wireless communication systems are widely deployed to provide various types of communication content such as voice, data, video, music, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, and Orthogonal Frequency Division Multiple Access (OFDMA) systems, and others.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established via a single-in-single-out, multiple-in-single-out or a multiple-in-multiple-out (MIMO) system.

As terminals or devices communicate with each other and send packets back and forth, the sending device should be made aware whether a packet has been received successfully or whether the packet should be retransmitted. As such, the receiving device can send an acknowledgement (ACK), which indicates that the packet was received successfully. If the packet was not received successfully, a negative acknowledgement (NAK) is transmitted. This negative acknowledgement indicates that the packet should be resent.

Hybrid Automatic Repeat-reQuest (HARQ) utilizes forward error correcting codes to correct a subset of errors and relies on the error detection to detect uncorrectable errors. Erroneously received packets are discarded and the receiving device requests retransmission of packets not successfully received. HARQ protection is available for data, however, retransmission of ACK/NAK on the uplink does not have HARQ protection.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects relate to improving reliability of the ACK transmission on the uplink by choosing constellation points that correspond to the edges of the constellation. An aspect relates to a method for maximizing a Euclidean distance for ACK/NAK transmissions. The method includes encoding an ACK transmission as a function of a size of the ACK and a modulation order to obtain a bit sequence. The ACK transmission is intended for at least one device. The method also includes combining two or more bit sequences as a function of the modulation order and scrambling the combined bit sequences as a function of the size of the ACK transmission and the modulation order. The scrambling constrains a constellation size of the ACK transmission embedded in a data channel. Further, the method includes sending to the at least one device the ACK transmission in reply to receipt of a packet from the at least one device.

Another aspect relates to a communications apparatus that includes a memory and a processor. The memory retains instructions related to encoding an ACK with escape sequences to obtain a bit sequence, combining two or more bit sequences, scrambling the combined bit sequences as a function of a size of the ACK and a modulation order, and transmitting the ACK. The processor is coupled to the memory and is configured to execute the instructions retained in the memory.

Still another aspect relates to a communications apparatus that improves reliability of an ACK transmission on an uplink. The apparatus includes means for encoding an ACK transmission with escape sequences as a function of the size of an ACK and a modulation order and means for obtaining a bit sequence by concatenation of multiple encoded ACK blocks. Apparatus also includes means for scrambling interleaved bit sequences as a function of the ACK size and a modulation order to obtain a HARQ-ACK and means for conveying the HARQ-ACK.

Yet another aspect relates to a computer program product comprising a computer-readable medium. The computer-readable medium includes a first set of codes for causing a computer to encode a 1-bit ACK differently than a 2-bit ACK. The encoding is a function of a modulation order. The computer-readable medium includes a second set of codes for causing the computer to combine a plurality of encoded blocks obtained from the encoding. Also included is a third set of codes for causing the computer to scramble the combined plurality of encoded blocks and a fourth set of codes for causing the computer to send the scrambled encoded blocks. The scrambling is a function of the number of ACK bits and the modulation order.

Still another aspect relates to at least one processor configured to maximizing a Euclidean distance for ACK/NAK transmissions. The processor includes a first module for encoding an ACK transmission abased on a size of the ACK and a modulation order to obtain a bit sequence. The size of the ACK is 1-bit or 2-bits. The processor also includes a second module for combining two or more bit sequences and a third module for scrambling the combined bit sequences as a function of the size of the ACK and the modulation order. The scrambling constrains a constellation size of the ACK embedded in a data channel of 1-bit to Binary Phase Shift Keying and 2-bit to Quadrature Phase-Shift Keying. Also included in processor is a fourth module for transmitting the ACK.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
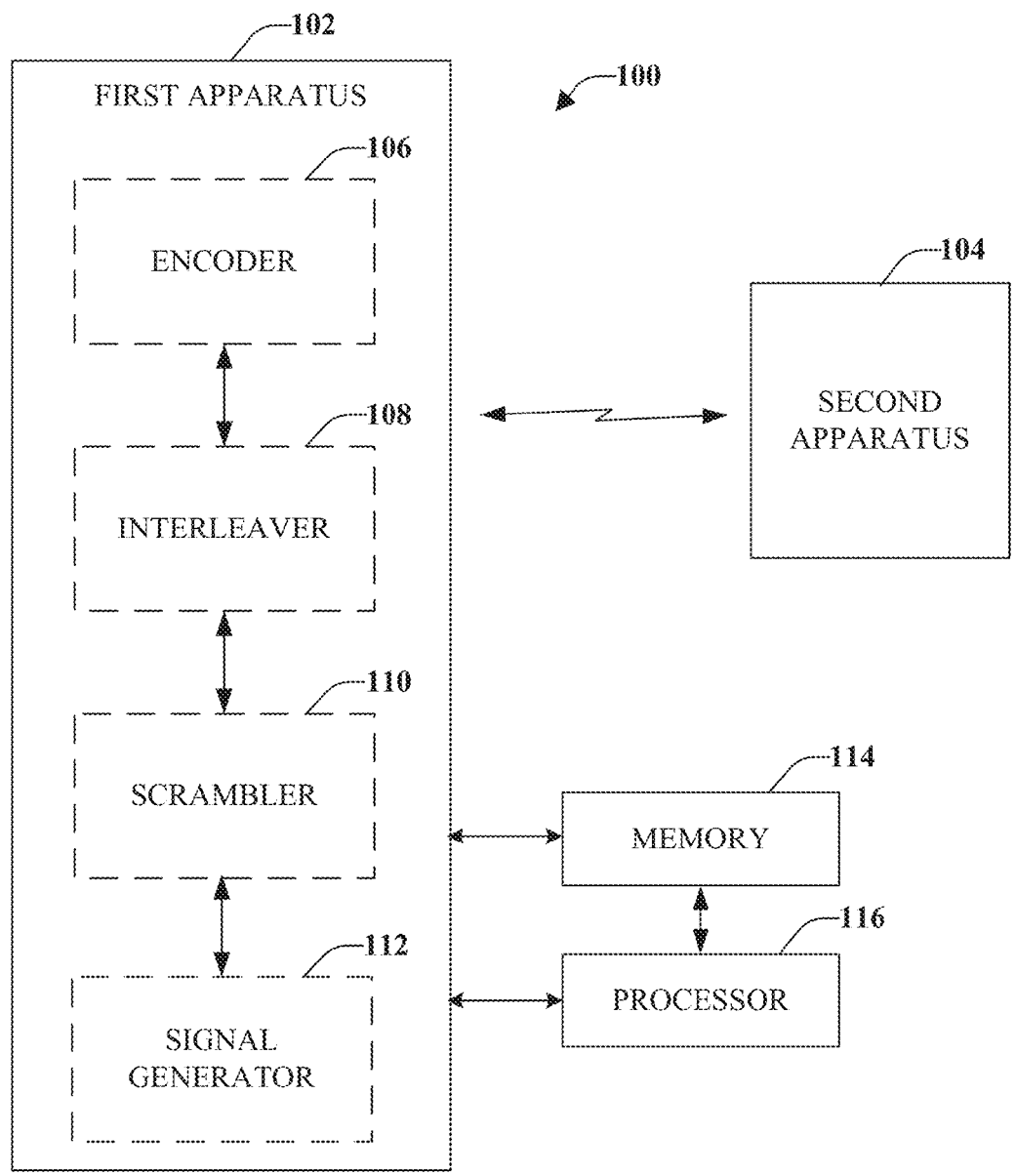
FIG. 1 illustrates a system for maximizing the Euclidean distance of coding, scrambling, and modulation for ACK/NAK by choosing constellation points corresponding to the edges of the constellation.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

With reference to FIG. 1, illustrated is a system 100 for maximizing the Euclidean distance of coding, scrambling, and modulation for ACK/NAK by choosing constellation points corresponding to the edges of the constellation. System 100 is configured to help improve the reliability of ACK/NAK transmissions on the uplink by choosing constellation points that correspond to the edges of the constellation. For ACK/NAK, a modulation symbol used for control signaling carries one bit or two bits of coded control information, regardless of the Physical Uplink Shared Channel (PUSCH) modulation scheme. System 100 utilizes escape sequences in the coding of the ACK/NAK information, wherein the escape sequences can be correctly interpreted. Although various aspects will be described with reference to ACK, these aspects can be applied to NAK transmissions also.

Included in system 100 are a first apparatus 102 that communicates with a second apparatus 104. First apparatus 102 and second apparatus 104 are configured to both send and receive information. While describing various aspects, first apparatus 102 might also be referred to as a transmitter and second apparatus might be referred to as a receiver. Although a number of transmitter(s) 102 and receiver(s) 104 can be included in system 100 as will be appreciated, a single transmitter 102 that transmits communication data signals to a single receiver 104 is illustrated for purposes of simplicity.

For purposes of this detailed description, transmitter 102 has received a packet from receiver 104 and is to send an acknowledgement (ACK) or a negative acknowledgement (NAK) to receiver 104 in reply. An ACK comprises acknowledgement characters that indicate the data received (from second apparatus 104) has been received correctly. A NAK indicates that the data was received with an error and, therefore, the data (e.g., packet) should be retransmitted. For ACK/NAK, the encoding, scrambling and modulation should maximize the Euclidean distance. For ACK/NAK (in the case of Frequency Division Duplex (FDD)), a modulation symbol used for control signaling carries at most two-bits of coded control information, regardless of the Physical Uplink Shared Channel (PUSCH) modulation scheme.

In order to maximize the Euclidean distance, an encoder 106 can be configured to encode ACK information as a function of the number of bits (e.g., 1-bit, 2-bits) and a modulation order $Q_m$. The modulation order $Q_m$ can be an order of 2, 4, or 6. A modulation order of 2 corresponds to Quadrature Phase-Shift Keying (QPSK). A modulation order of 4 corresponds to 16QAM (Quadrature Amplitude Modulation), which is a higher-order modulation of QPSK. A modulation order of 6 corresponds to 64QAM, which is a modulation of a higher order than 16QAM. A higher-order modulation implies that a modulation alphabet is extended to include additional signaling alternatives, which allows for the communication of more bits of information per modulation symbol. For QPSK, the modulation alphabet comprises four different signaling alternatives. Extending to 16QAM modulation provides for sixteen different signaling alternatives. A further extension to 64QAM provides the availability of sixty-four different signaling alternatives.

As previously stated, encoder 106 is configured to encode ACK information as a function of number of bits and modulation order $Q_n$. The table below (Table 1) illustrates encoding of 1-bit HARQ-ACK, where "x" represents an escape sequence, which is utilized to notify a scrambler 110 that a particular scrambling function should be performed:

TABLE 1

| $Q_m$ | Encoded HARQ-ACK |
|---|---|
| 2 | $[o_0^{ACK}\ x]$ |
| 4 | $[o_0^{ACK}\ x\ x\ x]$ |
| 6 | $[o_0^{ACK}\ x\ x\ x\ x\ x]$ |

The table below (Table 2) illustrates encoding of 2-bit HARQ-ACK:

TABLE 2

| $Q_m$ | Encoded HARQ-ACK |
|---|---|
| 2 | $[o_1^{ACK}\ o_0^{ACK}]$ |
| 4 | $[o_1^{ACK}\ o_0^{ACK}\ x\ x]$ |
| 6 | $[o_1^{ACK}\ o_0^{ACK}\ x\ x\ x\ x]$ |

Encoder 106 obtains an encoded bit sequence, $q_0^{ACK}$, $q_1^{ACK}$, $q_2^{ACK}$, ..., $q_{Q_{ACK}-1}^{ACK}$, by concatenation of multiple encoded HARQ-ACK blocks, where $Q_{ACK}$ is the total number of coded bits for all encoded HARQ-ACK blocks. These are derived as blocks because later in the encoding chain the blocks are input into a modulator. Thus, a QPSK modular will take the concatenation of multiple encoded HARQ-ACK blocks in sets of two. A 16QAM modulation will take the concatenation of multiple encoded HARQ-ACK blocks in sets of four. Further, a 64QAM modulator will take the concatenation of multiple encoded HARQ-ACK blocks in sets of six.

A vector sequence output of the channel coding for HARQ-ACK information is denoted by $\underline{q}_0^{ACK}$, $\underline{q}_1^{ACK}$, ..., $\underline{q}_{Q'_{ACK}-1}^{ACK}$, where $Q'_{ACK}=Q_{ACK}/Q_m$. The vector sequence is obtained as follows:

Set i, k to 0
while i < $Q_{ACK}$
    $\underline{q}_k^{ACK} = [q_i^{ACK} ... q_{i+Q_m-1}^{ACK}]^T$
    i = i + $Q_m$
    k = k + 1
end while The vector sequence $\underline{q}_0^{ACK}$, $\underline{q}_1^{ACK}$, ..., $\underline{q}_{Q'_{ACK}-1}^{ACK}$ is then multiplexed with the encoded data and interleaved on a "time-first" manner, by an interleaver 108. The output of the channel interleaver 108 is the input to the processing of PUSCH. A scrambler 110 performs the following operations depending on whether the ACK is a 1-bit ACK or a 2-bit ACK and depending on the modulation order (e.g., QPSK, 16QAM, 64QAM). Thus, the scrambling is a function of the size and the modulation order.

The scrambler 110 attempts to obtain two corners in any constellation for the transmission of ACK on PUSCH (e.g., effective Binary Phase-Shift Keying (BPSK) modulation). Thus, for a 1-bit ACK with a $Q_M$ of 2 (QPSK), the coded bit sequence [b(i) x] is scrambled as [$\tilde{b}$(i) $\tilde{b}$(i)], where $\tilde{b}$(i)=(b(i)+c(i))mod 2. This scrambling can be performed in accordance with the following pseudo code:

Set i = 0
while i < $M_{bit}$
   if b(i) = x    // ACK/NAK or Rank Indication placeholder bits
      $\tilde{b}$ (i) = 1
   else
      if b (i) = y    // ACK/NAK or Rank Indication repetition placeholder bits
      $\tilde{b}$ (i) = $\tilde{b}$ (i − 1)
Else    // Data or channel quality coded bits, Rank Indication coded bits or ACK/NAK coded bits
$\tilde{b}$ (i) = (b(i) + c(i)) mod 2
end if
   end if
i = i + 1
end while where x and y are tags and where c(i) is the scrambling sequence. The scrambling sequence generator 112 can be initialized with $c_{init}=n_{RNTI} \cdot 2^{14}+\lfloor n_s/2 \rfloor \cdot 2^9+N_{ID}^{cell}$ at the beginning of each subframe, where $n_{RNTI}$ corresponds to the Radio-Network Temporary Identifier (RNTI) associated with the PUSCH transmission.

For a 1-bit ACK with a $Q_M$ of 4 (16QAM), the coded bit sequence [b(i) x x x] is scrambled as [b̃(i) b̃(i) 1 1]. For a 1-bit ACK with a $Q_M$ of 6 (64QAM), the coded bit sequence [b(i) x x x x x] is scrambled as [b̃(i) b̃(i) 1 1 1 1].

For a 2-bit ACK, the scrambler 110 attempts to obtain four corners in any constellation for the transmission of ACK on PUSCH (e.g., effective QPSK modulation). Thus, for a 2-bit ACK with a $Q_m$ of 2 (QPSK), the coded bit sequence [b(i) b(i+1)] is scrambled as [b̃(i) b̃(i+1)]. If ACK is 2-bits and $Q_m$ is 4 (16QAM), the coded bit sequence [b(i) b(i+1) x x] is scrambled as [b̃(i) b̃(i+1) 1 1]. For a $Q_m$ of 6 (64QAM) and 2-bits, the coded bit sequence [b(i) b(i+1) x x x x] is scrambled as [b̃(i) b̃(i+1) 1 1 1 1].

As discussed above, during scrambling "1s" are appended. However, in accordance with some aspects, "1" is not used but something else is used, such as "2" or a non-zero 1, or a non-binary one, and so forth. The remainder of the processing performed by transmitter 102 (e.g., modulation, transform precoder, and so forth) is transparent to the presence or absence of control information. A signal generator 112 is configured to convey the ACK/NAK to second apparatus 104.

System 100 can include memory 114 operatively coupled to first apparatus 102. Memory 114 can be external to first apparatus 102 or can reside within first apparatus 102. Memory 114 can store information related to encoding a modulation order of an ACK transmission to obtain an encoded HARQ-ACK block, concatenating two or more of the encoded HARQ-ACK blocks to obtain a coded bit sequence, scrambling the coded bit sequence as function of the ACK size and a modulation order, and transmitting the scrambled bit sequence, and other suitable information related to signals transmitted and received in a communication network. A processor 116 can be operatively connected to first apparatus 102 (and/or memory 114) to facilitate analysis of information related to maximizing the Euclidean distance for the ACK transmission in a communication network. Processor 116 can be a processor dedicated to analyzing and/or generating information received by first apparatus 102, a processor that controls one or more components of system 100, and/or a processor that both analyzes and generates information received by first apparatus 102 and controls one or more components of system 100.

Memory 114 can store protocols associated with maximizing a Euclidean distance for the ACK transmission, taking action to control communication between first apparatus 102 and second apparatus 104 and so forth, such that system 100 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 2:
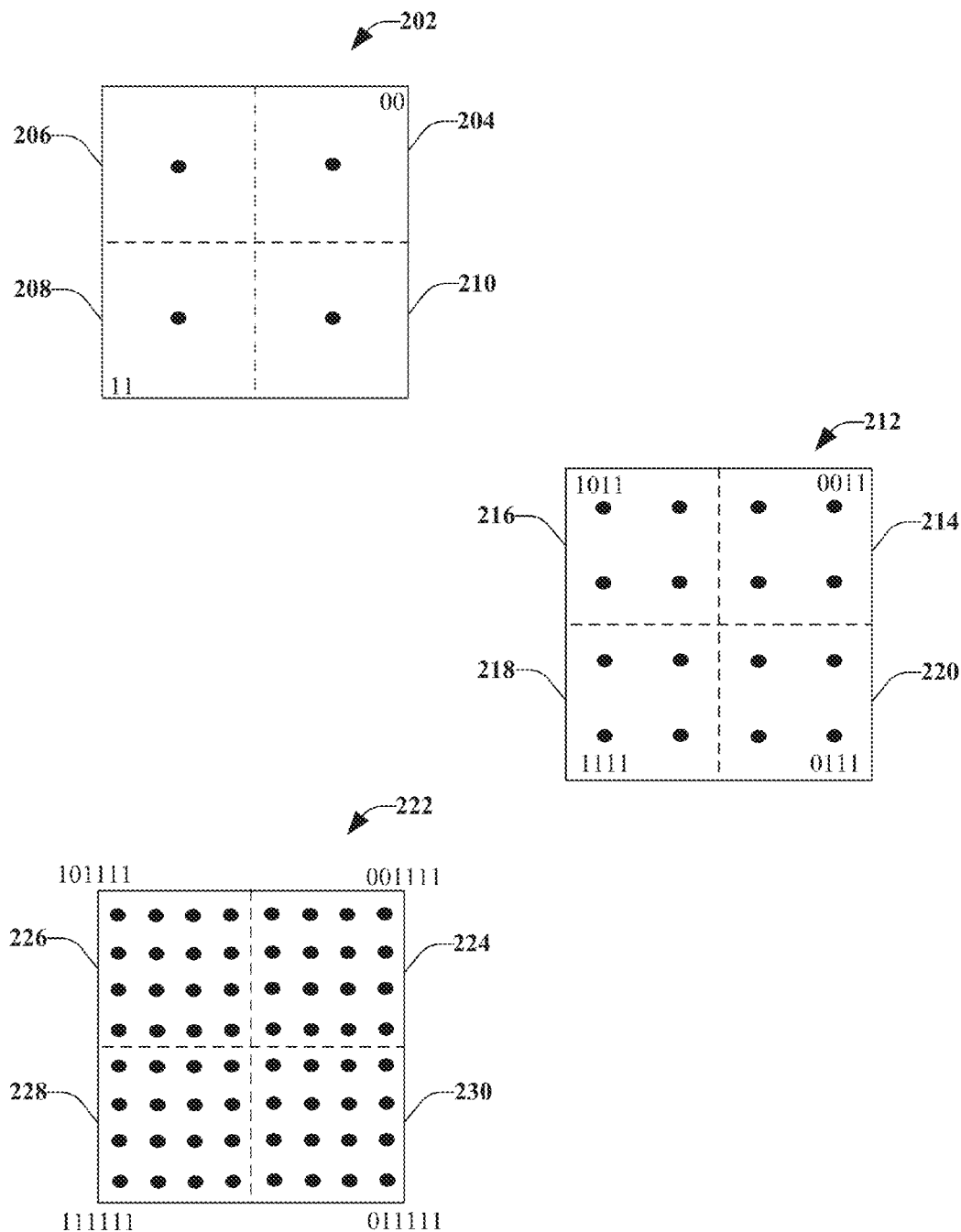
FIG. 2 illustrates modulation mapping, according to an aspect.

To appreciate fully the disclosed aspects, FIG. 2 illustrates modulation mapping, according to an aspect. Illustrated, at 202 is a signal constellation for QPSK modulation, which consists of four different signaling alternatives. To visualize these signaling alternatives, a two-dimensional plane is divided into four quadrants 204, 206, 208, and 210. The four points, one point in each quadrant 204-210, represents the four different alternatives. QPSK allows for communication of up to 2-bits of information during each modulation-symbol interval. For 1-bit, the disclosed aspects achieve two corners, specifically the upper right corner (in quadrant 204) and the lower left corner (in quadrant 208), which correspond to "00" and "11".

At 212, a signal constellation for 16QAM is illustrated. Extending to 16QAM modulation allows for the availability of sixteen different signaling alternatives. With 16QAM, up to 4-bits of information can be communicated during each modulation-symbol interval as illustrated by the points in each quadrant 214, 216, 218, and 220. In the situation of 16QAM modulation, quadruplets of bits, b(i),b(i+1),b(i+2), b(i+3), are mapped to complex-valued modulation symbols x=I+jQ according to the following table (Table 3):

TABLE 3

| b(i), b(i + 1), b(i + 2), b(i + 3) | I | Q |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

For 16QAM, the disclosed aspects attempt to achieve the four corners of the constellation. Thus, modulation mapping for the top right quadrant 214 is "0011". For the top left quadrant 216, the modulation mapping is "1011. For the bottom left quadrant 218, the modulation mapping is "1111" and for the bottom right quadrant 220, the modulation mapping is "0111". Such corners can be achieved through utilization of the escape sequences and the encoding, scrambling, and modulation disclosed herein.

The modulation scheme can be further extended to a 64QAM, which provides sixty-four different signaling alternatives. In this case, up to 6-bits of information can be communicated each modulation-symbol interval. The constellation for 64QAM is illustrated at 222. In the situation of 64QAM modulation, hextuplets of bits, b(i), b(i+1), b(i+2), b(i+3), b(i+4), b(i+5), are mapped to complex-valued modulation symbols x=I+jQ according to the following table (Table 4):

TABLE 4

| b(i), b(i + 1), b(i + 2), b(i + 3), b(i + 4), b(i + 5) | I | Q |
|---|---|---|
| 000000 | $3/\sqrt{42}$ | $3/\sqrt{42}$ |
| 000001 | $3/\sqrt{42}$ | $1/\sqrt{42}$ |
| 000010 | $1/\sqrt{42}$ | $3/\sqrt{42}$ |
| 000011 | $1/\sqrt{42}$ | $1/\sqrt{42}$ |
| 000100 | $3/\sqrt{42}$ | $5/\sqrt{42}$ |
| 000101 | $3/\sqrt{42}$ | $7/\sqrt{42}$ |
| 000110 | $1/\sqrt{42}$ | $5/\sqrt{42}$ |
| 000111 | $1/\sqrt{42}$ | $7/\sqrt{42}$ |
| 001000 | $5/\sqrt{42}$ | $3/\sqrt{42}$ |
| 001001 | $5/\sqrt{42}$ | $1/\sqrt{42}$ |
| 001010 | $7/\sqrt{42}$ | $3/\sqrt{42}$ |
| 001011 | $7/\sqrt{42}$ | $1/\sqrt{42}$ |
| 001100 | $5/\sqrt{42}$ | $5/\sqrt{42}$ |
| 001101 | $5/\sqrt{42}$ | $7/\sqrt{42}$ |
| 001110 | $7/\sqrt{42}$ | $5/\sqrt{42}$ |
| 001111 | $7/\sqrt{42}$ | $7/\sqrt{42}$ |
| 010000 | $3/\sqrt{42}$ | $-3/\sqrt{42}$ |
| 010001 | $3/\sqrt{42}$ | $-1/\sqrt{42}$ |
| 010010 | $1/\sqrt{42}$ | $-3/\sqrt{42}$ |
| 010011 | $1/\sqrt{42}$ | $-1/\sqrt{42}$ |
| 010100 | $3/\sqrt{42}$ | $-5/\sqrt{42}$ |
| 010101 | $3/\sqrt{42}$ | $-7/\sqrt{42}$ |
| 010110 | $1/\sqrt{42}$ | $-5/\sqrt{42}$ |
| 010111 | $1/\sqrt{42}$ | $-7/\sqrt{42}$ |
| 011000 | $5/\sqrt{42}$ | $-3/\sqrt{42}$ |
| 011001 | $5/\sqrt{42}$ | $-1/\sqrt{42}$ |
| 011010 | $7/\sqrt{42}$ | $-3/\sqrt{42}$ |
| 011011 | $7/\sqrt{42}$ | $-1/\sqrt{42}$ |
| 011100 | $5/\sqrt{42}$ | $-5/\sqrt{42}$ |
| 011101 | $5/\sqrt{42}$ | $-7/\sqrt{42}$ |
| 011110 | $7/\sqrt{42}$ | $-5/\sqrt{42}$ |
| 011111 | $7/\sqrt{42}$ | $-7/\sqrt{42}$ |
| 100000 | $-3/\sqrt{42}$ | $3/\sqrt{42}$ |
| 100001 | $-3/\sqrt{42}$ | $1/\sqrt{42}$ |
| 100010 | $-1/\sqrt{42}$ | $3/\sqrt{42}$ |
| 100011 | $-1/\sqrt{42}$ | $1/\sqrt{42}$ |
| 100100 | $-3/\sqrt{42}$ | $5/\sqrt{42}$ |
| 100101 | $-3/\sqrt{42}$ | $7/\sqrt{42}$ |
| 100110 | $-1/\sqrt{42}$ | $5/\sqrt{42}$ |
| 100111 | $-1/\sqrt{42}$ | $7/\sqrt{42}$ |
| 101000 | $-5/\sqrt{42}$ | $3/\sqrt{42}$ |
| 101001 | $-5/\sqrt{42}$ | $1/\sqrt{42}$ |
| 101010 | $-7/\sqrt{42}$ | $3/\sqrt{42}$ |
| 101011 | $-7/\sqrt{42}$ | $1/\sqrt{42}$ |
| 101100 | $-5/\sqrt{42}$ | $5/\sqrt{42}$ |
| 101101 | $-5/\sqrt{42}$ | $7/\sqrt{42}$ |
| 101110 | $-7/\sqrt{42}$ | $5/\sqrt{42}$ |
| 101111 | $-7/\sqrt{42}$ | $7/\sqrt{42}$ |
| 110000 | $-3/\sqrt{42}$ | $-3/\sqrt{42}$ |
| 110001 | $-3/\sqrt{42}$ | $-1/\sqrt{42}$ |
| 110010 | $-1/\sqrt{42}$ | $-3/\sqrt{42}$ |
| 110011 | $-1/\sqrt{42}$ | $-1/\sqrt{42}$ |
| 110100 | $-3/\sqrt{42}$ | $-5/\sqrt{42}$ |
| 110101 | $-3/\sqrt{42}$ | $-7/\sqrt{42}$ |
| 110110 | $-1/\sqrt{42}$ | $-5/\sqrt{42}$ |
| 110111 | $-1/\sqrt{42}$ | $-7/\sqrt{42}$ |
| 111000 | $-5/\sqrt{42}$ | $-3/\sqrt{42}$ |
| 111001 | $-5/\sqrt{42}$ | $-1/\sqrt{42}$ |
| 111010 | $-7/\sqrt{42}$ | $-3/\sqrt{42}$ |
| 111011 | $-7/\sqrt{42}$ | $-1/\sqrt{42}$ |
| 111100 | $-5/\sqrt{42}$ | $-5/\sqrt{42}$ |
| 111101 | $-5/\sqrt{42}$ | $-7/\sqrt{42}$ |
| 111110 | $-7/\sqrt{42}$ | $-5/\sqrt{42}$ |
| 111111 | $-7/\sqrt{42}$ | $-7/\sqrt{42}$ |

The 64QAM constellation 222 is broken up into four quadrants 224, 226, 228, and 230. The corners of the top right quadrant 224 is "001111". The top left quadrant 226 is "101111". The bottom left quadrant 228 is "111111" and the bottom right quadrant 230 is "011111". The disclosed encoding, scrambling, and modulation of the disclosed aspects can maximize the Euclidean distance in order to obtain the four corners of the constellation 222.

Figure 3:
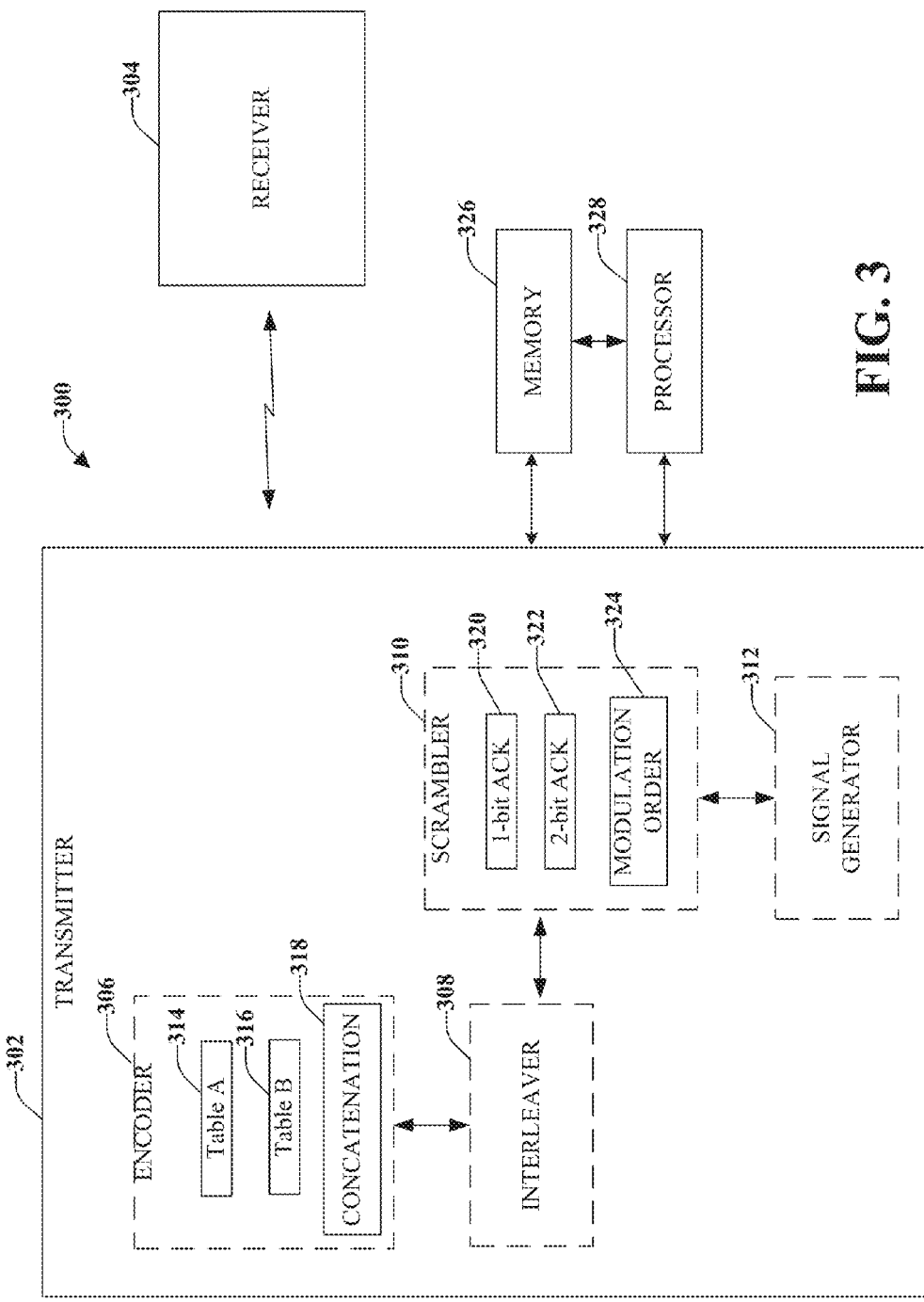
FIG. 3 illustrates a system for improving reliability of an ACK transmission on an uplink by choosing constellation points that correspond to the edges of the constellation.

FIG. 3 illustrates a system 300 for improving reliability of an ACK transmission on the uplink by choosing constellation points that correspond to the edges of the constellation. System 300 can limit the maximum modulation order used to signal ACK/NAK on PUSCH. Included in system are two devices, labeled transmitter 302 and receiver 304. It should be noted that the terms transmitter and receiver are utilized for purposes of simplicity and both devices 302, 304 can transmit and receive communications.

Transmitter 302 includes an encoder 306 that is configured to encode 1-bit and 2-bit HARQ-ACKs as a function of the number of bits and a modulation order $Q_m$. Also included is an interleaver 308 that is configured to interleave encoded data on a "time-first" manner, for example. Also included in transmitter 302 is a scrambler 310 that is configured to scramble the ACK, which is conveyed to a receiver 304 by a signal generator 312.

In order to perform the proper encoding of the 1-bit and 2-bit HARQ-ACKs, encoder 306 can be configured to reference information, which can be included in Table A 314 and Table B 316. Table A 314 (as discussed above) can include information related to encoding of 1-bit HARQ-ACK. Table B 316 can include information related to encoding of 2-bit HARQ-ACK. Each table 314, 316 can include a cross reference to the modulation order $Q_m$.

For example, Table A 314 can include information that for 1-bit and a $Q_m$ of 2 (QPSK), the encoded HARQ-ACK is $[o_0^{ACK}\ x]$. The "x" represents an escape sequence or placeholder which can be utilized to scramble (by scrambler 310) the HARQ-ACK bits in a manner that maximizes the Euclidean distance of the modulation symbols carrying HARQ-ACK information For a $Q_m$ of 4 (16QAM) and 1-bit, the encoded HARQ-ACK is $[o_0^{ACK}\ x\ x\ x]$, which includes three escape sequences (or placeholders). For a $Q_m$ of 6 (64QAM) and 1-bit, the encoded HARQ-ACK is $[o_0^{ACK}\ x\ x\ x\ x\ x]$, which includes five escape sequences (placeholders).

Table B 316 can provide that for encoding of a 2-bit HARQ-ACK with a $Q_m$ of 2 (QPSK), the encoded HARQ-ACK is $[o_1^{ACK}\ o_0^{ACK}]$. For 2-bit and $Q_m$ of 4 (16QAM), the encoded HARQ-ACK included two escape sequences (or placeholders) and is expressed as $[o_1^{ACK}\ o_0^{ACK}\ x\ x]$. Further, for 2-bit and $Q_m$ of 6 (64QAM), the encoded HARQ-ACK includes four placeholders or escape sequences and is expressed as $[o_1^{ACK}\ o_0^{ACK}\ x\ x\ x\ x]$. Thus, if the HARQ-ACK includes 1-bit of information, it is encoded according to Table A 314. If the HARQ-ACK includes 2-bits of information, it is encoded according to Table B 316.

Concatenation 318 of multiple encoded HARQ-ACK blocks is performed to obtain a bit sequence and a vector sequence is obtained. The vector sequence is multiplexed with the encoded data and interleaved (by interleaver 108) on a "time-first" manner. The scrambler 110 performs scrambling as a function of the bit size of the ACK (1-bit ACK 320 or 2-bit ACK 322) and the modulation order 324.

System 300 also includes a memory 326 and a processor 328 that is operatively connected to transmitter 302. Memory 326 retains instructions related to ACK encoding and scrambling to constrain the modulation order of ACK transmission embedded in the data channel to BPSK for 1-bit ACK and to QPSK for 2-bit ACK, irrespective of the modulation order used for the data transmission. Processor 328 is coupled to the memory 326 and is configured to execute the instructions retained in memory 326.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
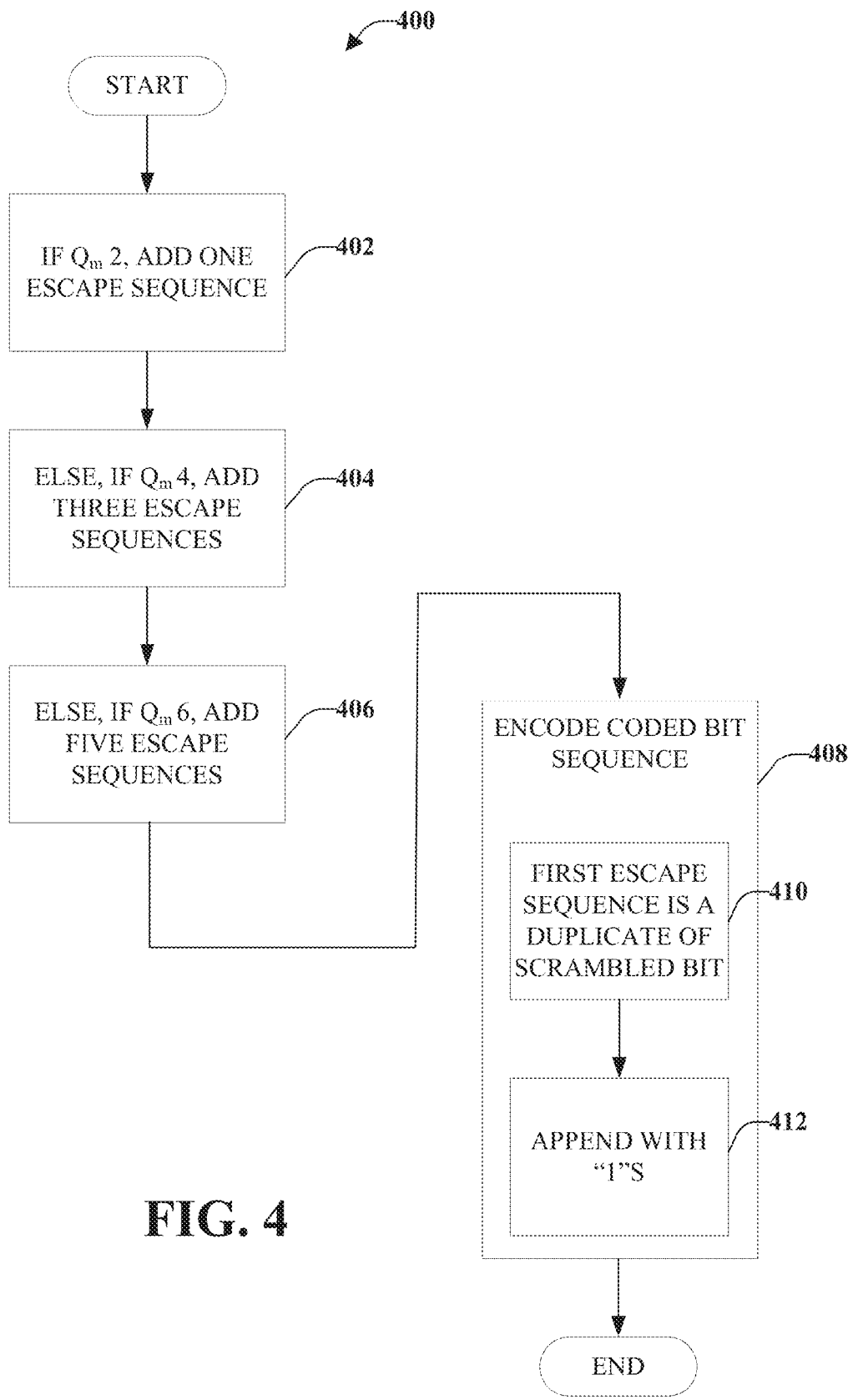
FIG. 4 illustrates a method for encoding and scrambling a one-bit HARQ-ACK, in accordance with an aspect.

FIG. 4 illustrates a method 400 for encoding and scrambling a one-bit HARQ-ACK, in accordance with an aspect. The encoding and scrambling can be determined as a function of the number of bits and the modulation order. The modulation order, $Q_m$, can be 2 (QPSK), 4 (16QAM), or 6 (64QAM). At 402, if $Q_m$ is 2, the HARQ-ACK block is derived by adding one escape sequence (or place holder), thus, the encoded HARQ-ACK is $[o_0^{ACK}\ x]$. Else, if $Q_m$ is 4, at 404, the HARQ-ACK block is derived by adding three escape sequences (or place holders). For $Q_m$ 4, the encoded HARQ-ACK is $[o_0^{ACK}\ x\ x\ x]$. If $Q_m$ is 6, the HARQ-ACK block is derived by adding five escape sequences (or place holders), at 406, and the encoded HARQ-ACK is $[o_0^{ACK}\ x\ x\ x\ x\ x]$.

At 408, a bit sequence is generated by concatenation of multiple encoded HARQ-ACKs, as obtained at 402, 404, or 406. The encoded HARQ-ACKs are treated as blocks, such that when further processing is performed the blocks are utilized in an appropriate manner. For example, a QPSK modulator will take the concatenation of multiple encoded HARQ-ACK blocks in sets of two; a 16QAM modulation will take the concatenation of multiple encoded HARQ-ACK blocks in sets of four; and a 64QAM modulator will take the concatenation of multiple encoded HARQ-ACK blocks in sets of six.

At 410, the bit sequence is scrambled. This scrambling can include duplicating the previous scrambled bit, at 412, where the first escape sequence is the duplicate bit. At 414, the reminder of the escape sequences (if any) are appended with "1s". Further information related to scrambling will be discussed with reference to the following figure.

Figure 5:
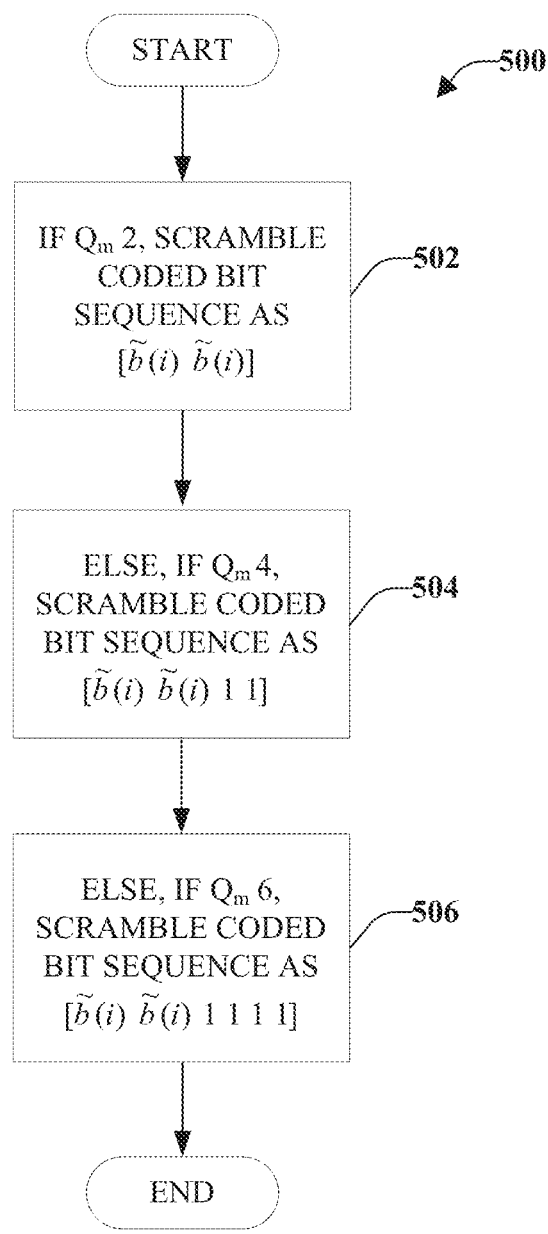
FIG. 5 illustrates a method for scrambling 1-bit HARQ-ACKs in accordance with an aspect.

FIG. 5 illustrates a method 500 for scrambling 1-bit HARQ-ACKs in accordance with an aspect. The 1-bit HARQ-ACK can be encoded, as discussed with reference to FIG. 4. The scrambling of the HARQ-ACK is a function of the size of the ACK (e.g., 1-bit) and the modulation order (e.g., QPSK, 16QAM, 64QAM). At 502, if the modulation order $Q_m$ is 2 (QPSK), the coded bit sequence, [b(i) x], is scrambled as $[\tilde{b}(i)\ \tilde{b}(i)]$, where $\tilde{b}(i)=(b(i)+c(i))\bmod 2$. Else, if the modulation order $Q_m$ is 4 (16QAM), at 504, the coded bit sequence [b(i) x x x] is scrambled as $[\tilde{b}(i)\ \tilde{b}(i)\ 1\ 1]$. Else, if $Q_m$ is 6 (64QAM), at 506, the coded bit sequence [b(i) x x x x x] is scrambled as $[\tilde{b}(i)\ \tilde{b}(i)\ 1\ 1\ 1\ 1]$.

Figure 6:
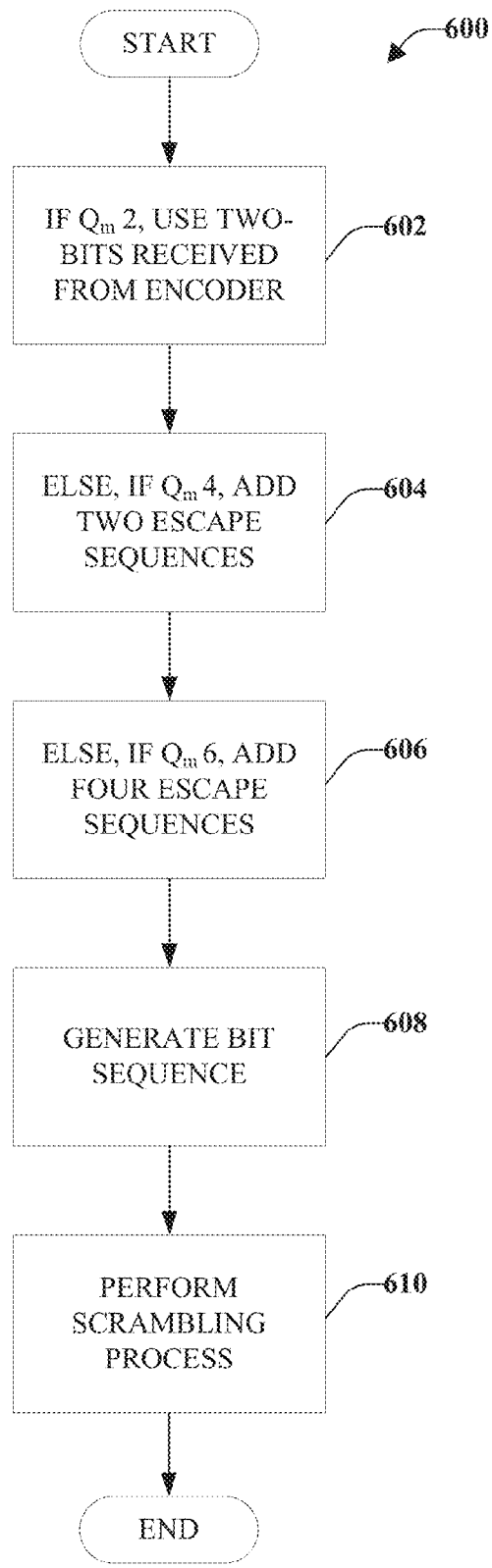
FIG. 6 illustrates a method for encoding and scrambling a two-bit HARQ-ACK, in accordance with an aspect.

With reference now to FIG. 6, illustrated is a method 600 for encoding and scrambling a two-bit HARQ-ACK, in accordance with an aspect. The encoding and scrambling can be determined as a function of the number of bits and the modulation order. The modulation order, $Q_m$, can be 2 (QPSK), 4 (16QAM), or 6 (64QAM).

At 602, two coded bits $[o_1^{ACK}\ o_0^{ACK}]$ are utilized if $Q_m$ is 2 (QPSK). If $Q_m$ is 4 (16QAM), at 604, two escape sequences are added, and the encoded HARQ-ACK block is $[o_1^{ACK}\ o_0^{ACK}\ x\ x]$. Else, if $Q_m$ is 6 (64QAM), at 606, four escape sequences are added and the HARQ-ACK block is $[o_1^{ACK}\ o_0^{ACK}\ x\ x\ x\ x]$.

Figure 7:
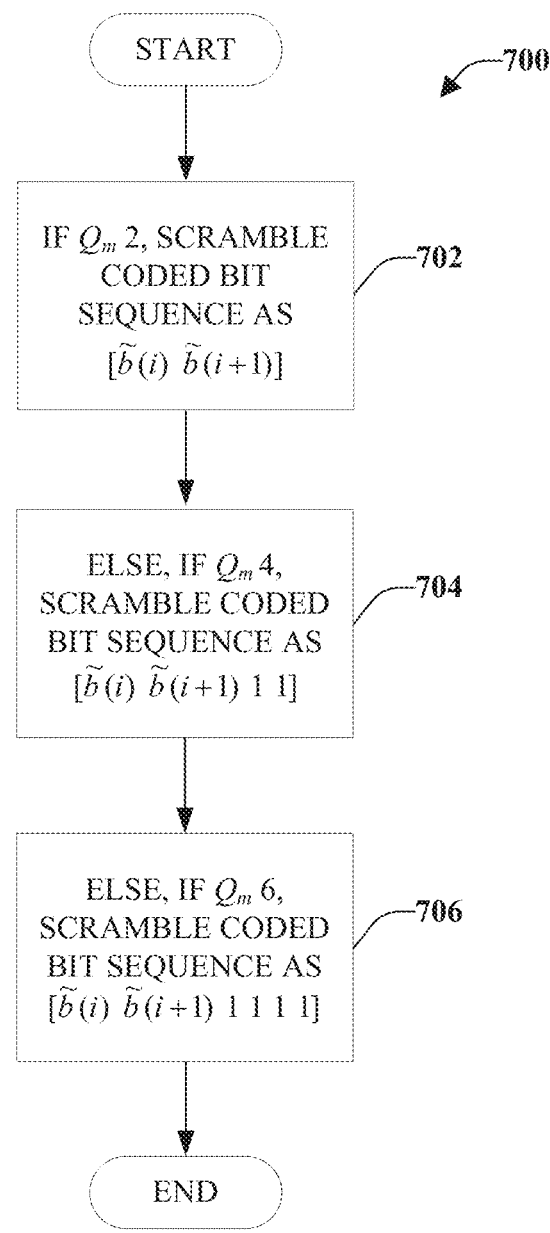
FIG. 7 illustrates a method for scrambling 2-bit HARQ-ACKs in accordance with an aspect.

At 608, the bit sequence $q_0^{ACK}$, $q_1^{ACK}$, $q_2^{ACK}$, ..., $q_{Q_{ACK}-1}^{ACK}$, is obtained by concatenation of multiple encoded HARQ-ACK blocks, as determined at 602, 604, or 606. A scrambling process is performed, at 610 on the bit sequence, which will now be described with reference to FIG. 7, which illustrates a method 700 for scrambling 2-bit HARQ-ACKs in accordance with an aspect. The scrambling is performed as a function of the number of bits (2-bits) and the modulation order (e.g., QPSK, 16QAM, 64QAM). The scrambling is performed to achieve the four corners in any constellation for the transmission of ACK on PUSCH (e.g., effective QPSK modulation).

At 702, if $Q_m$ is 2 (QPSK), the coded bit sequence [b(i) b(i+1)] is scrambled as $[\tilde{b}(i)\ \tilde{b}(i+1)]$. Else, if $Q_m$ is 4 (16QAM), the coded bit sequence [b(i) b(i+1) x x] is scrambled as $[\tilde{b}(i)\ \tilde{b}(i+1)\ 1\ 1]$, at 704. Else, if $Q_m$ is 6 (64QAM), the coded bit sequence [b(i) b(i+1) x x x x] is scrambled as $[\tilde{b}(i)\ \tilde{b}(i+1)\ 1\ 1\ 1\ 1]$.

Figure 8:
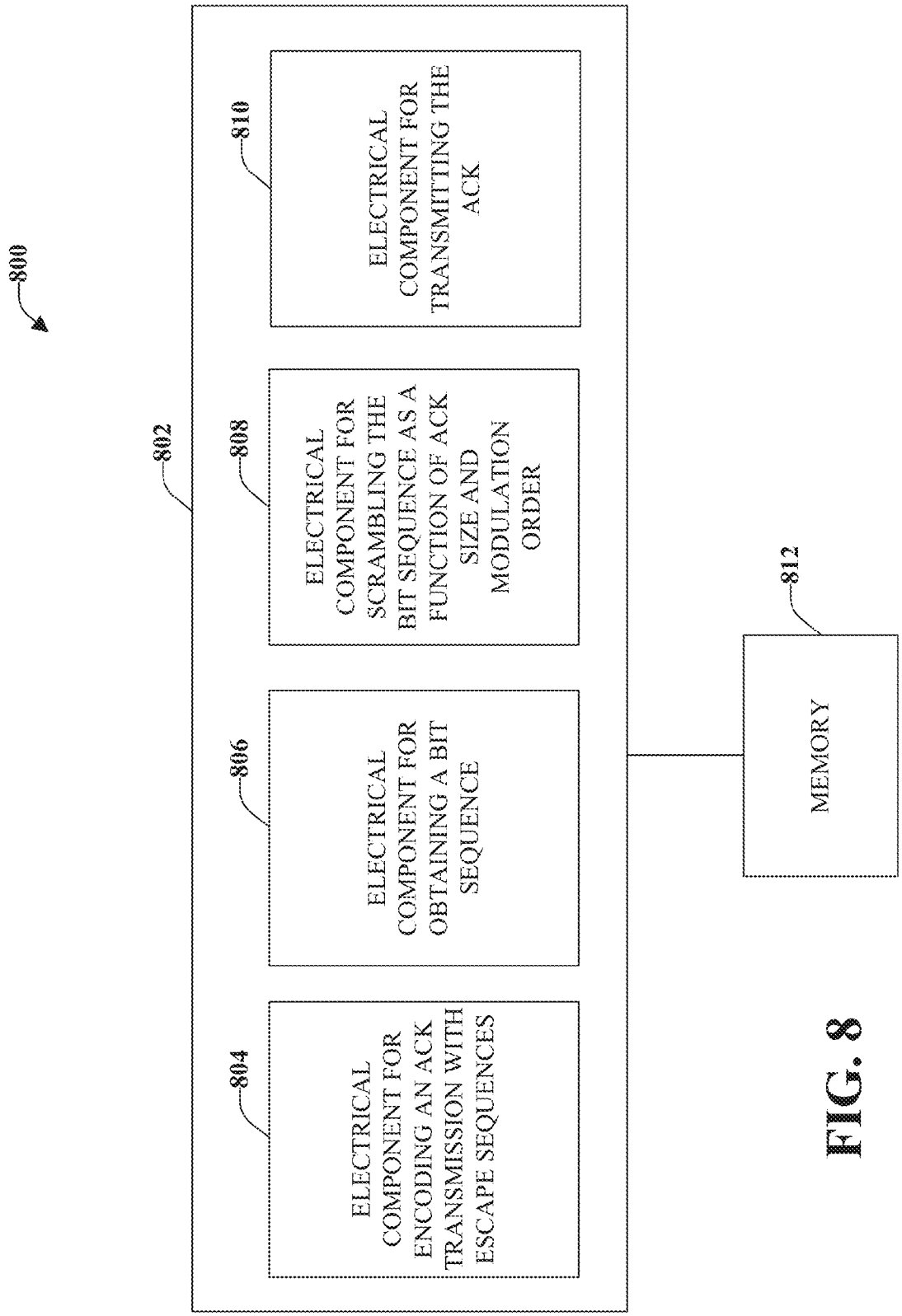
FIG. 8 illustrates an example system that utilizes coding, scrambling, and modulation to maximize a Euclidean distance for ACK/NAK, according to an aspect.

With reference to FIG. 8, illustrated is an example system 800 that utilizes coding, scrambling, and modulation to maximize a Euclidean distance for ACK/NAK, according to an aspect. System 800 can reside at least partially within a mobile device. It is to be appreciated that system 800 is represented as including functional blocks, which may be functional blocks that represent functions implemented by a processor, software, or combination thereof (e.g., firmware).

System 800 includes a logical grouping 802 of electrical components that can act separately or in conjunction. Logical grouping 802 can include an electrical component 804 for encoding an ACK transmission with escape sequences as a function of the size of a HARQ-ACK and a modulation order. The size can be 1-bit or 2-bits and the modulation order can be 2 (QPSK), 4 (16QAM), or 6 (64QAM).

Also included in logical grouping 802 is an electrical component 806 for obtaining a bit sequence by concatenation of multiple encoded ACK blocks and an electrical component 808 for scrambling interleaved bit sequences as a function of the ACK size and a modulation order. The scrambling constrains a constellation size of the ACK transmissions embedded in a data channel. Electrical component 808 constrains a constellation size to Binary Phase Shift Keying for a 1-bit transmission and to Quadrature Phase-Shift Keying for a 2-bit ACK transmission. Further, logical grouping 802 includes an electrical component 810 for transmitting the ACK.

In accordance with some aspects, the size of the ACK transmission is 1-bit and a modulation order is 2, the coded bit sequence [b(i) x] is scrambled as $[\tilde{b}(i)\ \tilde{b}(i)]$, where $\tilde{b}(i)=(b(i)+c(i))\bmod 2$. In accordance with another aspect, the size of the ACK transmission is 1-bit and a modulation order is 4, the coded bit sequence [b(i) x x x] is scrambled as $[\tilde{b}(i)\ \tilde{b}(i)\ 1\ 1]$. According to another aspect, the size of the ACK transmission is 1-bit and a modulation order is 6, the coded bit sequence [b(i) x x x x x] is scrambled as $[\tilde{b}(i)\ \tilde{b}(i)\ 1\ 1\ 1\ 1]$. In accordance with a further aspect, the size of the ACK transmission is 2-bits and a modulation order is 2, the coded bit sequence [b(i) b(i+1)] is scrambled as $[\tilde{b}(i)\ \tilde{b}(i+1)]$. In yet another aspect, the size of the ACK transmission is 2-bits and a modulation order is 4, the coded bit sequence [b(i) b(i+1) x x] is scrambled as $[\tilde{b}(i)\ \tilde{b}(i+1)\ 1\ 1]$. In accordance with another aspect, the size of the ACK transmission is 2-bits and a modulation order is 6, the coded bit sequence [b(i) b(i+1) x x x x] is scrambled as [$\bar{b}$(i) $\bar{b}$(i+1) 1 1 1 1].

System 800 can include a memory 812 that retains instructions for executing functions associated with electrical components 804, 806, 808, and 810 or other components. While shown as being external to memory 812, it is to be understood that one or more of electrical components 804, 806, 808, and 810 can exist within memory 812.

Figure 9:
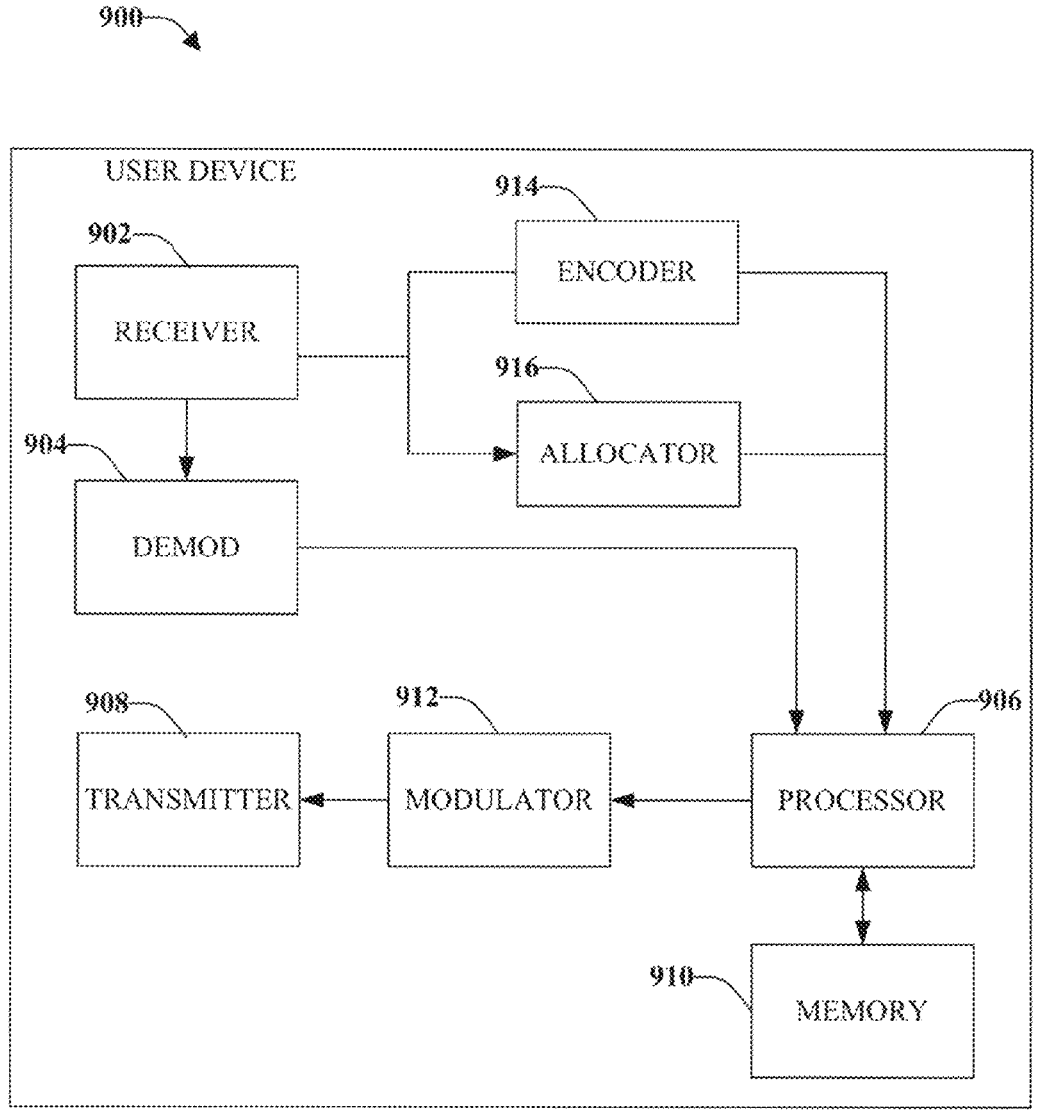
FIG. 9 illustrates a system that facilitates maximizing the Euclidean distance for ACK/NAK in accordance with one or more of the disclosed aspects.

With reference now to FIG. 9, illustrated is a system 900 that facilitates maximizing the Euclidean distance for ACK/NAK in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with maximizing the Euclidean distance. User device 900 can further comprise a symbol modulator 912 and a transmitter 908 that transmits the modulated signal.

Figure 10:
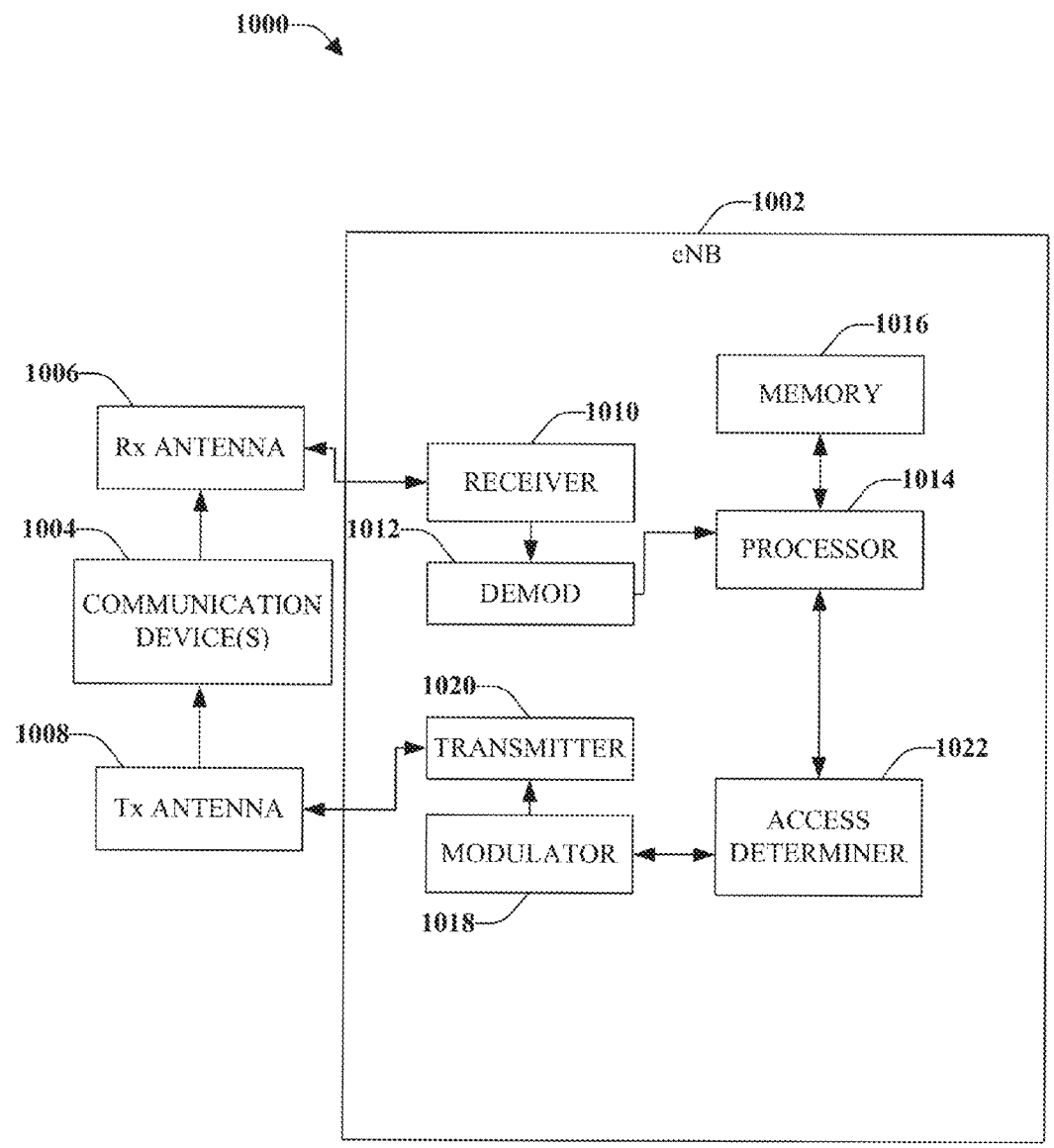
FIG. 10 is an illustration of a system that facilitates achieving the corners in any constellation for the transmission of ACK in accordance with various aspects presented herein.

FIG. 10 is an illustration of a system 1000 that facilitates achieving the corners in any constellation for the transmission of ACK in accordance with various aspects presented herein. System 1000 comprises a base station or access point 1002. As illustrated, base station 1002 receives signal(s) from one or more communication devices 1004 (e.g., user device) by a receive antenna 1006, and transmits to the one or more communication devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to maximizing a Euclidean distance. A modulator 1018 can multiplex the signal for transmission by a transmitter 1020 through transmit antenna 1008 to communication devices 1004.

Figure 11:
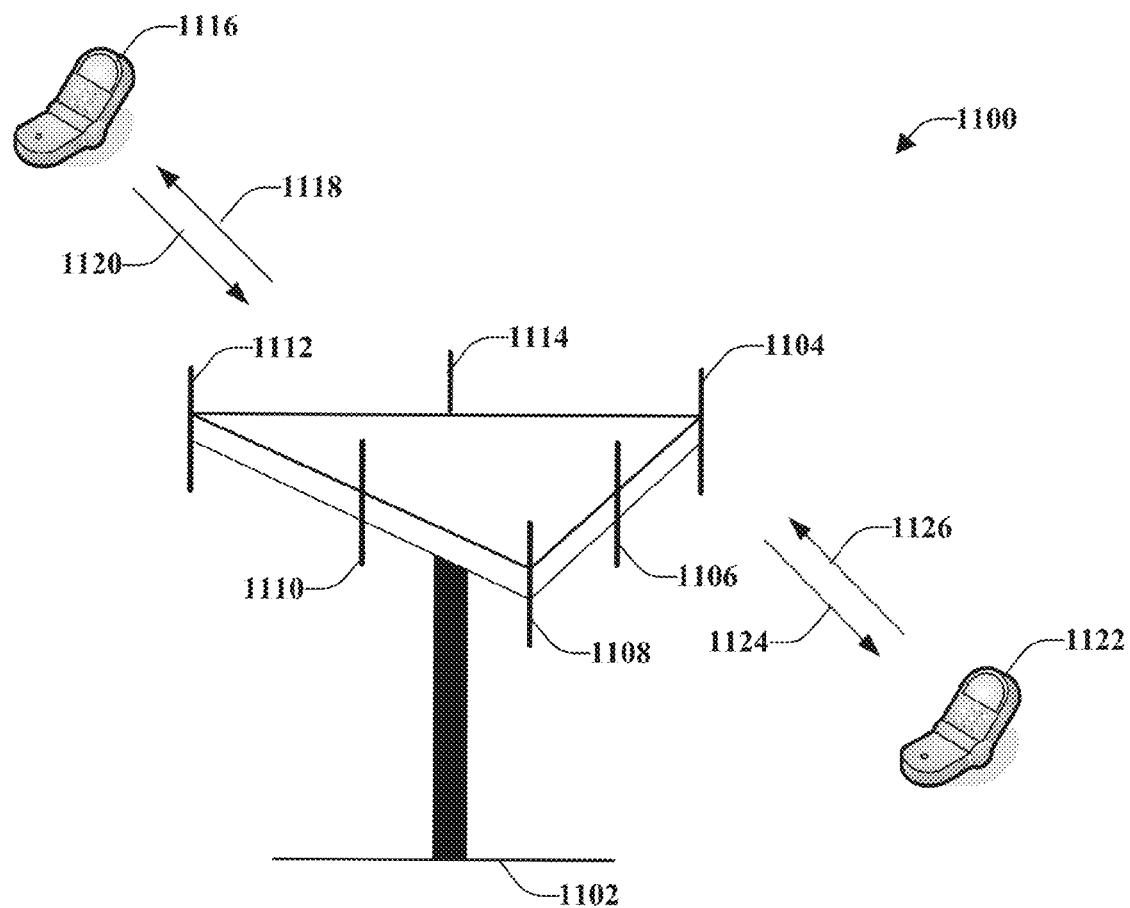
FIG. 11 illustrates a multiple access wireless communication system according to one or more aspects.

Referring now to FIG. 11, a multiple access wireless communication system 1100 according to one or more aspects is illustrated. A wireless communication system 1100 can include one or more base stations in contact with one or more user devices. Each base station provides coverage for a plurality of sectors. A three-sector base station 1102 is illustrated that includes multiple antenna groups, one including antennas 1104 and 1106, another including antennas 1108 and 1110, and a third including antennas 1112 and 1114. According to the figure, only two antennas are shown for each antenna group, however, more or fewer antennas may be utilized for each antenna group. Mobile device 1116 is in communication with antennas 1112 and 1114, where antennas 1112 and 1114 transmit information to mobile device 1116 over forward link 1118 and receive information from mobile device 1116 over reverse link 1120. Forward link (or downlink) refers to the communication link from the base stations to mobile devices, and the reverse link (or uplink) refers to the communication link from mobile devices to the base stations. Mobile device 1122 is in communication with antennas 1104 and 1106, where antennas 1104 and 1106 transmit information to mobile device 1122 over forward link 1124 and receive information from mobile device 1122 over reverse link 1126. In a FDD system, for example, communication links 1118, 1120, 1124, and 1126 might utilize different frequencies for communication. For example, forward link 1118 might use a different frequency than the frequency utilized by reverse link 1120.

Each group of antennas and/or the area in which they are designated to communicate may be referred to as a sector of base station 1102. In one or more aspects, antenna groups each are designed to communicate to mobile devices in a sector or the areas covered by base station 1102. A base station may be a fixed station used for communicating with the terminals.

In communication over forward links 1118 and 1124, the transmitting antennas of base station 1102 can utilize beamforming in order to improve a signal-to-noise ratio of forward links for the different mobile devices 1116 and 1122. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

Figure 12:
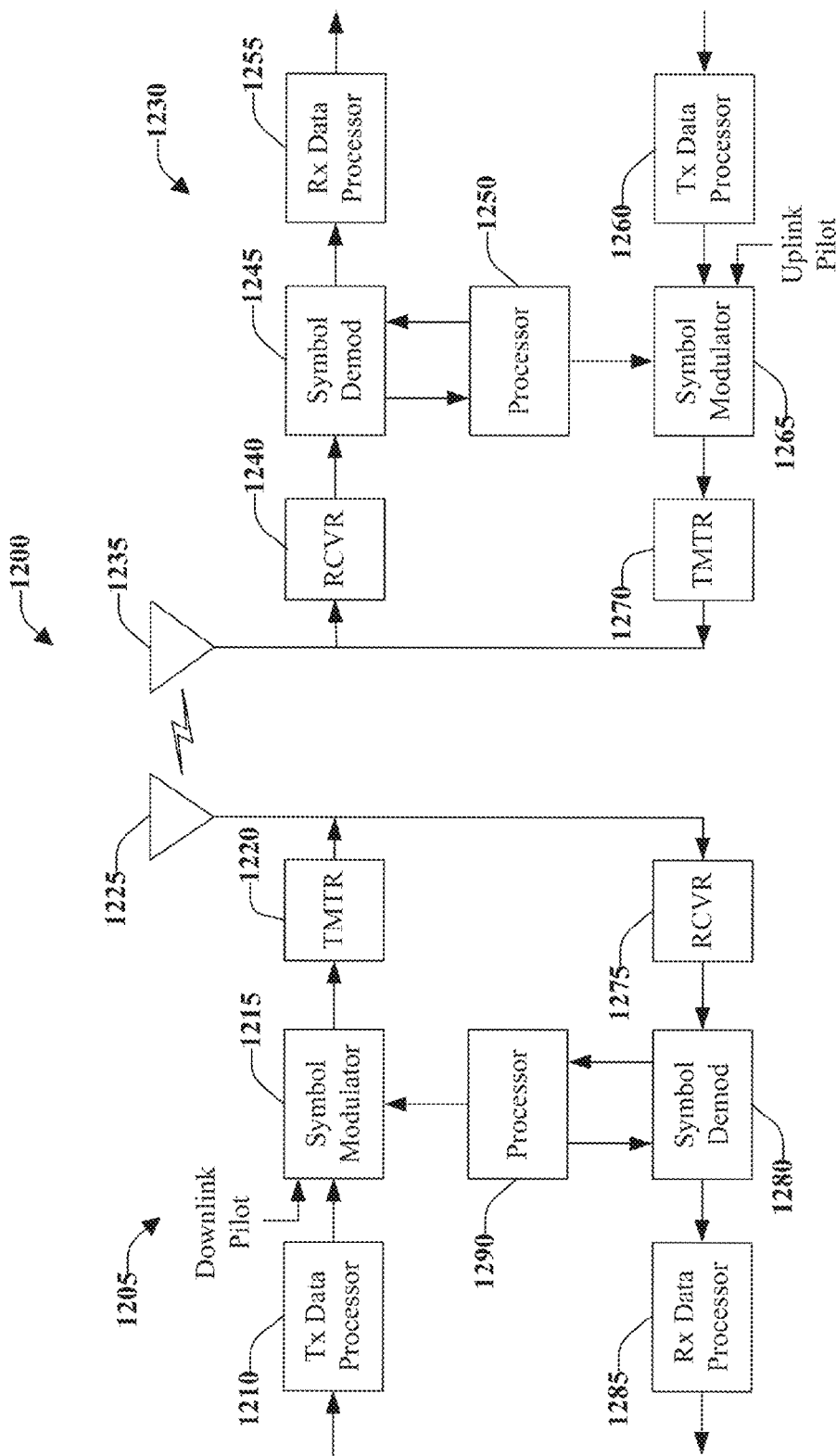
FIG. 12 illustrates an exemplary wireless communication system, according to various aspects.

FIG. 12 illustrates an exemplary wireless communication system 1200, according to various aspects. Wireless communication system 1200 depicts one base station and one terminal for sake of brevity. However, it is to be appreciated that system 1200 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 obtains N received symbols and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink.

Processors 1290 and 1250 direct (e.g., control, coordinate, manage, . . . ) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for facilitating maximizing a Euclidean distance for an acknowledgement (ACK) or a negative acknowledgement (NAK) transmission on an uplink, comprising:
   transmitting a packet to at least one device;
   receiving an ACK/NAK transmission from the at least one device in response to the packet, wherein the ACK/NAK transmission is encoded as a function of a size of the ACK/NAK transmission in number of bits and a modulation order to obtain a bit sequence, the bit sequence is scrambled based on the size of the ACK/NAK transmission and the modulation order to constrain a constellation size of the ACK/NAK transmission embedded in a data channel based on the size of the ACK/NAK transmission, and the size of the ACK/NAK transmission is less than the modulation order so that constellation points are chosen to correspond to edges of a constellation; and
   decoding the received ACK/NAK transmission to determine whether to retransmit the packet to the at least one device.

2. The method of claim 1, wherein the bit sequence is scrambled to constrain the constellation size to Binary Phase Shift Keying (BPSK) for a 1-bit ACK/NAK transmission.

3. The method of claim 1, wherein the bit sequence is scrambled to constrain the constellation size to Quadrature Phase-Shift Keying (QPSK) for a 2-bit ACK/NAK transmission.

4. The method of claim 1, wherein the size of the ACK/NAK transmission is 1-bit and a modulation order is 2, the coded bit sequence [b(i) x] is scrambled as [$\bar{b}(i)$ $\bar{b}(i)$], where $\tilde{b}(i)=(b(i)+c(i))\bmod 2$, where $b(i)$ is an integer bit value, $c(i)$ is a scrambling sequence, and x is an integer placeholder.

5. The method of claim 1, wherein the size of the ACK/NAK transmission is 1-bit and a modulation order is 4, the coded bit sequence [b(i) x x x] is scrambled as [$\tilde{b}$(i) $\tilde{b}$(i)1 1], where b(i) is an integer bit value and x is an integer placeholder.

6. The method of claim 1, wherein the size of the ACK/NAK transmission is 1-bit and a modulation order is 6, the coded bit sequence [b(i) x x x x x] is scrambled as [$\tilde{b}$(i) $\tilde{b}$(i)1 1 1 1], where b(i) is an integer bit value and x is an integer placeholder.

7. The method of claim 1, wherein the size of the ACK/NAK transmission is 2-bits and a modulation order is 2, the coded bit sequence [b(i) b(i+1)] is scrambled as [$\tilde{b}$(i) $\tilde{b}$(i+1)], where b(i) and b(i+1) are integer bit values.

8. The method of claim 1, wherein the size of the ACK/NAK transmission is 2-bits and a modulation order is 4, the coded bit sequence [b(i) b(i+1) x x] is scrambled as [$\tilde{b}$(i) $\tilde{b}$(i+1) 1 1], where b(i) and b(i+1) are integer bit values and x is an integer placeholder.

9. The method of claim 1, wherein the size of the ACK/NAK transmission is 2-bits and a modulation order is 6, the coded bit sequence [b(i) b(i+1) x x x x] is scrambled as [$\tilde{b}$(i) $\tilde{b}$(i+1) 1 1 1 1], where b(i) and b(i+1) are integer bit values and x is an integer placeholder.

10. A communications apparatus for facilitating maximizing a Euclidean distance for an acknowledgement (ACK) or a negative acknowledgement (NAK) transmission on an uplink, comprising:
a memory that retains instructions related to:
transmitting a packet to at least one device,
receiving an ACK/NAK transmission from the at least one device in response to the packet, wherein the ACK/NAK transmission is encoded as a function of a size of the ACK/NAK transmission in number of bits and a modulation order to obtain a bit sequence, the bit sequence is scrambled based on the size of the ACK/NAK transmission and the modulation order to constrain a constellation size of the ACK/NAK transmission embedded in a data channel based on the size of the ACK/NAK transmission, and the size of the ACK/NAK transmission is less than the modulation order so that constellation points are chosen to correspond to edges of a constellation, and
decoding the received ACK/NAK transmission to determine whether to retransmit the packet to the at least one device; and
a processor, coupled to the memory, configured to execute the instructions retained in the memory.

11. The communications apparatus of claim 10, wherein the bit sequence is scrambled to constrain the constellation size to Binary Phase Shift Keying (BPSK) for a 1-bit ACK/NAK transmission and obtain any two corners in a constellation for the 1-bit ACK/NAK transmission.

12. The communications apparatus of claim 10, wherein the bit sequence is scrambled to constrain the constellation size to Quadrature Phase-Shift Keying (QPSK) for a 2-bit ACK/NAK transmission and obtain any four corners in a constellation for the 2-bit ACK/NAK transmission.

13. The communications apparatus of claim 10, wherein the modulation order is 2 for Quadrature Phase-Shift Keying (QPSK), 4 for 16 Quadrature Amplitude Modulation (QAM), and 6 for 64 QAM.

14. A communications apparatus that facilitates maximizing a Euclidean distance for an acknowledgement (ACK) or a negative acknowledgement (NAK) transmission on an uplink, comprising:
means for transmitting a packet to at least one device;
means for receiving an ACK/NAK transmission from the at least one device in response to the packet, wherein the ACK/NAK transmission is encoded as a function of a size of the ACK/NAK transmission in number of bits and a modulation order to obtain a bit sequence, the bit sequence is scrambled based on the size of the ACK/NAK transmission and the modulation order to constrain a constellation size of the ACK/NAK transmission embedded in a data channel based on the size of the ACK/NAK transmission, and the size of the ACK/NAK transmission is less than the modulation order so that constellation points are chosen to correspond to edges of a constellation; and
means for decoding the received ACK/NAK transmission to determine whether to retransmit the packet to the at least one device.

15. The communications apparatus of claim 14, wherein the modulation order is 2 for Quadrature Phase-Shift Keying (QPSK), 4 for 16 Quadrature Amplitude Modulation (QAM), and 6 for 64 QAM.

16. The communications apparatus of claim 14, wherein the bit sequence is scrambled to constrain the constellation size to Binary Phase Shift Keying (BPSK) for a 1-bit ACK/NAK transmission and obtain any two corners in a constellation for the 1-bit ACK/NAK transmission.

17. The communications apparatus of claim 14, wherein the bit sequence is scrambled to constrain the constellation size to Quadrature Phase-Shift Keying (QPSK) for a 2-bit ACK/NAK transmission and obtain any four corners in a constellation for the 2-bit ACK/NAK transmission.

18. An apparatus for facilitating maximizing a Euclidean distance for an acknowledgment (ACK) transmission or a negative acknowledgement (NAK) transmission on an uplink, comprising:
at least one processor configured to:
transmit a packet to at least one device;
receive an ACK/NAK transmission from the at least one device in response to the packet, wherein the ACK/NAK transmission is encoded as a function of a size of the ACK/NAK transmission in number of bits and a modulation order to obtain a bit sequence, the bit sequence is scrambled based on the size of the ACK/NAK transmission and the modulation order to constrain a constellation size of the ACK/NAK transmission embedded in a data channel based on the size of the ACK/NAK transmission, and the size of the ACK/NAK transmission is less than the modulation order so that constellation points are chosen to correspond to edges of a constellation; and
decode the received ACK/NAK transmission to determine whether to retransmit the packet to the at least one device; and
a memory coupled with the at least one processor.

19. The apparatus of claim 18, wherein the modulation order is 2 for Quadrature Phase-Shift Keying (QPSK), 4 for 16 Quadrature Amplitude Modulation (QAM), and 6 for 64 QAM.

20. The apparatus of claim 18, wherein the bit sequence is scrambled to constrain the constellation size to Binary Phase Shift Keying (BPSK) for a 1-bit ACK/NAK transmission and obtain any two corners in a constellation for the 1-bit ACK/NAK transmission.

21. The apparatus of claim 18, wherein the bit sequence is scrambled to constrain the constellation size to Quadrature Phase-Shift Keying (QPSK) for a 2-bit ACK/NAK transmission and obtain any four corners in a constellation for the 2-bit ACK/NAK transmission.

22. A non-transitory computer-readable medium having computer executable code stored thereon for maximizing a Euclidean distance for an acknowledgement (ACK) transmission or a negative acknowledgement (NAK) transmission on an uplink, comprising:
- code for transmitting a packet to at least one device;
- code for receiving an ACK/NAK transmission from the at least one device in response to the packet, wherein the ACK/NAK transmission is encoded as a function of a size of the ACK/NAK transmission in number of bits and a modulation order to obtain a bit sequence, the bit sequence is scrambled based on the size of the ACK/NAK transmission and the modulation order to constrain a constellation size of the ACK/NAK transmission embedded in a data channel based on the size of the ACK/NAK transmission, and the size of the ACK/NAK transmission is less than the modulation order so that constellation points are chosen to correspond to edges of a constellation; and
- code for decoding the received ACK/NAK transmission to determine whether to retransmit the packet to the at least one device.

* * * * *